United States Patent [19]

Iizuka

[11] Patent Number: 4,711,547

[45] Date of Patent: Dec. 8, 1987

[54] DISPLAY DEVICE

[75] Inventor: Kiyoshi Iizuka, Kanagawa, Japan

[73] Assignee: Canon Kabushiki Kaisha

[21] Appl. No.: 802,751

[22] Filed: Nov. 27, 1985

[30] Foreign Application Priority Data

Nov. 28, 1984 [JP]  Japan .................................. 59-252278
Nov. 16, 1985 [JP]  Japan .................................. 60-171663

[51] Int. Cl.⁴ ............................................. G03B 17/18
[52] U.S. Cl. .................................... 354/471; 354/409;
354/474; 354/289.1
[58] Field of Search ............... 354/409, 465, 471, 472,
354/473, 474, 475, 127.1, 195.13, 219, 289.1

[56]  References Cited

U.S. PATENT DOCUMENTS

| | | | |
|---|---|---|---|
| 4,140,378 | 2/1979 | Suzuki et al. ........................ | 354/472 |
| 4,142,786 | 3/1979 | Suzuki et al. ........................ | 354/472 |
| 4,238,793 | 12/1980 | Hochstrate .......................... | 340/781 |
| 4,560,264 | 12/1985 | Kitazawa et al. .................... | 354/219 |
| 4,562,478 | 12/1985 | Hirasawa et al. .................... | 358/236 |
| 4,597,659 | 7/1986 | Suda et al. .......................... | 354/409 |

Primary Examiner—Russell E. Adams
Attorney, Agent, or Firm—Toren, McGeady & Associates

[57]  ABSTRACT

A display device includes a non-luminescent type display element (an electro-chromic display element) which changes concentration with a voltage applied thereto, and a self-luminescent type display element (an electro-luminescent display element) which emits light according as a voltage is applied thereto. The two display elements are laminated together and formed, one as a color forming layer and the other as a luminescent layer, into a desired shape for visual observation. The laminated display elements are arranged in a visually observable display part of the display device.

8 Claims, 7 Drawing Figures

DISPLAY DEVICE

BACKGROUND OF THE INVENTION

1. Field of the Invention

This invention relates to a display device and more particularly, to a display device which is suited for the view finder system of a camera or the like and comprises in combination display means of a self-luminescent type and display means of a non-luminenscent type.

2. Description of the Prior Art

Heretofore, varied kinds of data have been arranged to be displayed within the visual field of a single-lens reflex camera or a video camera, etc. For this purpose, display elements of varied kinds have been employed, including display means of the so-called non-luminescent type, utilizing reversible variations in concentration or colors of such matters as a liquid crystal, electrochromic display element (hereinafter referred to as ECD), etc., and the so-called self-luminescent type such as a light emitting diode (LED), electro-luminescent display element (hereinafter referred to as ELD), etc.

For displaying data of a plurality of kinds, such as data relative to an aperture, a shutter speed, a measured distance, etc., within the visual field of a view finder, a method called the superimposed display method is popularly employed. In this method, these data are arranged in the same place with one superposed upon another and some of them are selectively displayed as necessary. This display method has been employed in many cameras as it is easily observable.

However, in the display device of this kind, the use of the non-luminescent type display means makes the displayed data not readily discernible in the event of a black object to be photographed or a dark field while the use of the self-luminescent type display means makes the data not readily discernible in case that the luminance of an object to be photographed is high.

SUMMARY OF THE INVENTION

A first object of this invention is to provide a display device which is capable of always making a display in a satisfactorily discernible state without being affected by the luminance of the object to be photographed.

Another object of the invention is to provide a display device wherein the color forming layer of an electro-chromic display element and the luminescent layer of an electro-luminescent display element are formed into desired shapes of symbols or marks so that, for example, the required photographic data of a camera can be visually observed without difficulty when the photographer looks into the view finder of the camera.

A further object of the invention is to provide a display device wherein the color forming layer of an electro-chromic display element and the luminescent layer of an electro-luminescent display element are laminated and formed into desired shapes representing photographic data; the laminated shapes are arranged within the visual field frame of a view finder; and the actions of the two elements are selected at least on the basis of a data on the luminance of the object to be photographed.

These and further objects and features of this invention will become apparent from the following detailed description of embodiments thereof taken in connection with the accompanying drawings.

BRIEF DESCRIPTION OF THE DRAWINGS

FIG. 1 is a sectional view showing the essential parts of a display device embodying the invention.

FIG. 2 is an illustration of the display device in a state of being disposed within the frame of a view finder.

FIG. 3 is an illustration of the transmission factors of the display part and the non-display part of the ECD of the display device.

FIG. 4 is an illustration of the display device embodying this invention in a state of being arranged to display the photographic data of a camera.

FIG. 5 is a circuit disgram showing a circuit arrangement for selecting the operations of the ECD and ELD of the display device.

DETAILED DESCRIPTION OF THE PREFERRED EMBODIMENTS

Figure 1:
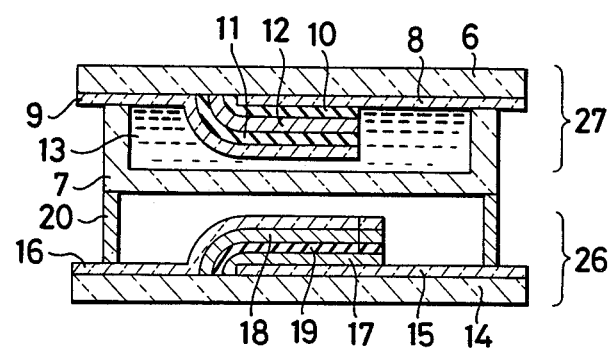
FIGS. 1 to 5 show an embodiment of this invention.

FIG. 1 is a sectional view showing a portion of a display device arranged according to this invention as an embodiment thereof. In this embodiment, the display part of the device is composed of an electro-chromic display element 26 (ECD), which is used as display means of the non-luminescent type, and an electro-luminescent display element 27 (ELD), which is used as display means of self-luminescent type. The ECD 26 comprises a first color forming layer 17, an insulation layer 19 and a second color forming layer 18, which are interposed in between transparent electrodes 15 and 16 on a glass base plate or substrate 14. The first color forming layer 17 is disposed on a cathode side and is made of, for example, tungstic oxide ($WO_2$ or $WO_3$). The insulation layer 19 is made of a dielectric matter such as zirconium dioxide ($ZrO_2$). The second color forming layer 18 is disposed on an anode side and is typically made of, for example, iridium oxide (IrOx). These layers 17, 19 and 18 are arranged one on top of another in a laminated state.

A negative voltage is arranged to be applied to the transparent electrode 15 which is connected to the first color forming layer 17 of the ECD 26. A positive voltage is arranged to be applied to the transparent electrode 16 which is connected to the second color forming layer 18 of the ECD 26. With the voltage applied in that manner, the insulation layer 19 causes a proton $H^+$ to be supplied to the first color forming layer 17 and a hydroxyl group $OH^-$ to the second color forming layer 18. Then, there takes place an oxidation-reduction reaction to impart a color to the ECD 26. This color disappears when a positive voltage is applied to the transpatent electrode 15 and a negative voltage to the other transparent electrode 16.

Meanwhile, the ELD 27 comprises a first insulation layer 10, a luminescent layer 12 and a second insulation layer 11 which are arranged one on top of another in a laminated state in between transparent electrodes 8 and 9 formed on a glass base plate 6. The first and second insulation layers 10 and 11 are typically made of, for example, yttrium oxide ($Y_2O_3$). The luminescent layer 12 is typically made of, for example, zinc sulfide (ZnS) doped with manganese (Mn). When a suitable AC voltage is applied between the transparent electrodes 8 and 9, a part sandwiched in between them in an intercrossing manner comes to emit light. Further, to prevent a dielectric breakdown due to sticking of water content, the ELD 27 is protected with a transparent silicon oil 13 which is inserted in between the ELD 27 and a glass base plate 7 which is disposed on the back side thereof.

A spacer 20 is arranged to unify the ELD 27 and the ECD 26 into one body.

In this specific embodiment, an information or data display is arranged to be made either selectively or simultaneously by driving the ELD 27 and/or ECD 26 with driving means which is not shown. While the ELD 27 and the ECD 26 are laminated in two layers in the embodiment described, they of course may be arranged in a larger number of layers than two layers.

Figure 2:
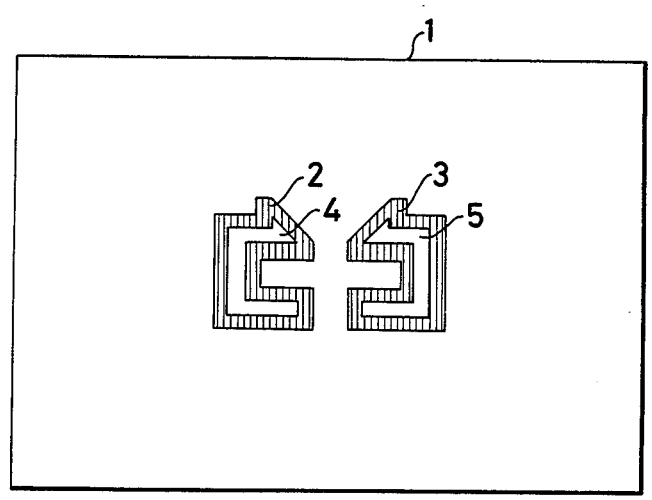

FIG. 2 shows the display device of this invention in a state of being arranged in a part of the visual field of a view finder of a camera or the like. In this embodiment, completion of distance measurement is arranged to be displayed with an arrow mark within the field frame of a view finder on the basis of a distance measurement signal produced from the camera which is not shown. For this embodiment, the display device is arranged such that: The turning direction of a lens is computed on the basis of the distance measurement signal and the display is made according to the result of the computation.

In this specific embodiment, if the object to be photographed is very bright and a data display within the visual field of the view finder is not readily discernible, arrow display parts 2 and 3 which are formed by the nonluminescent type ECD 26 are operated. Conversely, in the event of a dark object, arrow mark display parts 4 and 5 formed by the luminescent type ELD 27 are operated. This arrangement ensures that the displayed data are always readily observable irrespective of the luminance or brightness of the object.

Further, the brightness or darkness of the object to be photographed is arranged to be discriminated on the basis of a signal coming from a photo-sensitive element disposed either on the side of the camera or in a part of the view finder system.

Figure 3:
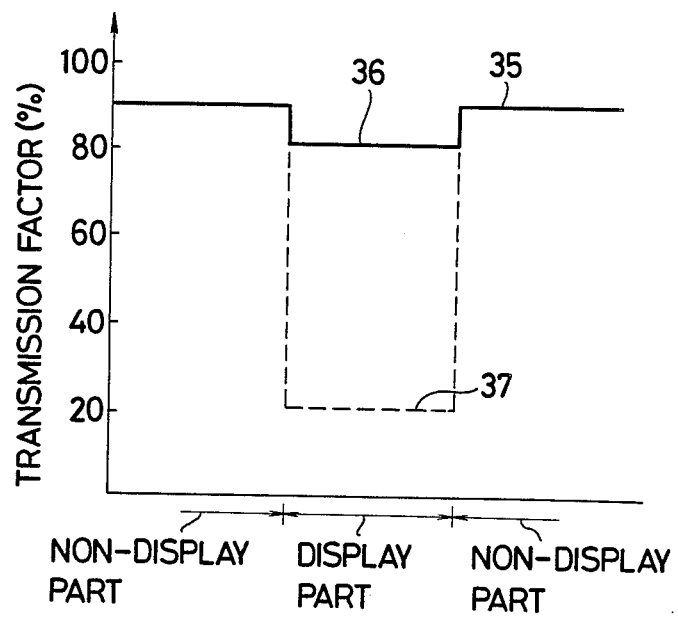

The ECD 26 which is employed in this embodiment is composed of varied materials as shown in FIG. 1. It is, therefore, difficult to arrange it to have a uniform transparency over the whole surface thereof. For example, as shown in FIG. 3, within the ECD 26, the transmission factor 35 of the non-display part differs from the factor 36 of the display part under a non-driven condition or a decolored condition. Therefore, with the display means arranged as shown in FIG. 2, the arrow display parts 2 and 3 are observed in a state of a somewhat colored pattern even under the decolored condition. It is preferable to have this display pattern arranged to denote something. For example, in the case of FIG. 2, the part encompassed with the arrow display parts 2 and 3 is preferably arranged to denote a distance measurement range.

Further, in FIG. 3, a part 37 indicated by a broken line represents the transmission factor of the ECD 26 obtained under the driven or colored condition.

Figure 4:
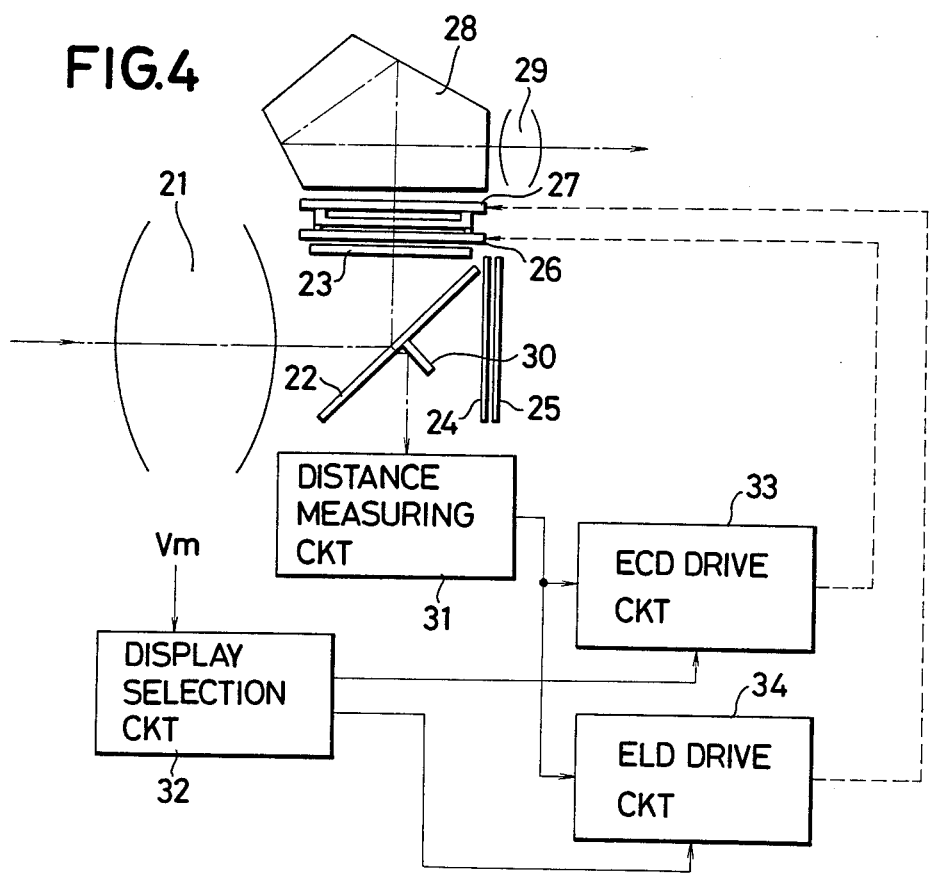

FIG. 4 schematically shows, by way of example, the display device in a state of being arranged as a distance measurement data display in a part of the view finder system of a single-lens reflex camera. Referring to FIG. 4, a light flux passing through a photo-taking optical system 21 is split into two light fluxes at a return mirror 22. A part of the light is transmitted through the mirror 22 to a distance measuring circuit 31 via an auxiliary mirror 30. The distance measuring circuit 31 is arranged to detect the focusing state of the photo-taking optical system 21.

The light flux reflected by the return mirror 22 forms a view finder image on a focusing screen 23. The view finder image formed on the focusing screen 23 is observable at an eye piece 29 via the display part consisting of the ECD 26, and the ELD 27 and a pentagonal prism 28. Meanwhile, a data on the luminance of the object to be photographed is supplied from a photo-sensitive element (not shown) to a display selection circuit 32. The display selection circuit 32 then decides which of the ELD 27 and ECD 26 is to be driven. Either an ECD drive circuit 33 or an ELD drive circuit 34 is driven according to the result of this decision. Then, a data relative to distance measurement is observed together with the view finder image formed on the focusing screen 23. The illustration in FIG. 4 further includes a photo-sensitive surface 25 and a shutter 24 of the camera.

The distance measuring circuit 31 shown in the circuit arrangement of FIG. 4 comprises: a distance measuring sensor consisting of a plurality of elements; an amplifier arranged to amplify the output signal of each of the distance measuring sensor elements; and a window comparator which is arranged to determine whether an object image is in focus according to the output of the amplifier and also to produce a signal indicating whether a motor driving a lens forming an object image is to be rotated to the right or to the left. These components are arranged as shown in FIG. 4 of drawings accompanying the specification of U.S. Pat. No. 4,443,086, issued Apr. 17, 1984.

While the display device embodying this invention is applied to the view finder of a single-lens reflex camera in the case of FIG. 4, the invention is likewise applicable to a lens shutter type camera, a video camera, etc.

The self-luminescent type display means according to this invention may be arranged not only to be driven with an AC voltage applied thereto but also may be driven with a DC voltage applied thereto. Further, in accordance with this invention, the selection between the display means of the non-luminescent type and the display means of the self-luminescent type may be manually accomplished. The display selection circuit 32 of FIG. 4 may be omitted with both the ELD 26 and ELD 27 arranged to be operated by means of a signal from the distance measuring circuit 31.

Figure 5:
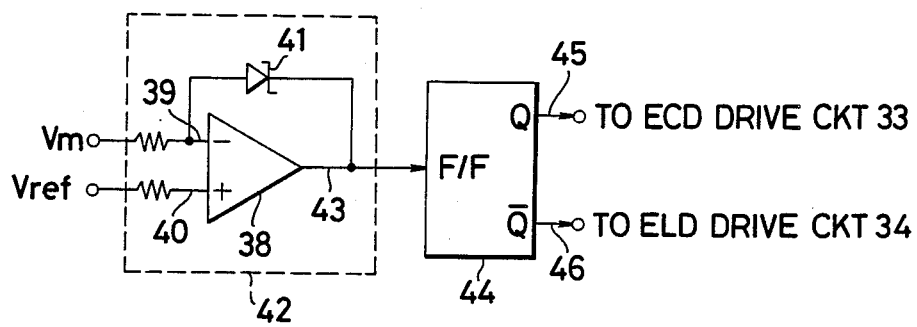

FIG. 5 shows, by way of example, an arrangement of the display selection circuit 32. In this case, the selection circuit 32 is arranged to selectively operate the ELD or the ECD according to a data on the luminance of the object to be photographed. Referring to FIG. 5, a signal Vm from photometric sensor is supplied to the input terminal 39 of an operational amplifier 38 of a level determining device 42. The other input terminal 40 of the operational amplifier 38 is supplied with a reference signal Vref which is used for classifying the level of the signal Vm between bright and dark levels. In this circuit, the output 43 of the amplifier 38 is at a low level when the incoming signal Vm is lower than the reference signal Vref. In other words, there obtains a forward potential ($\approx 0$ V) of a Zener diode 41. In the event of Vm$\geq$Vref, the level of the output 43 becomes high and there obtains a reverse potential ($\approx 5$ V) of the Zener diode 41. The output signal thus obtained is supplied to a flip-flop (hereinafter referred to as F/F) 44. The Q output 45 and the $\overline{Q}$ output 46 of the F/F 44 change their levels accordingly, as the level of the input signal becomes high or low. In the event of Vm≧Vref, i.e. when the output 43 is at a high level, the object to be photographed is a bright object. Therefore, upon receipt of the high level output 43, the level of the Q output 45 of the F/F 44 becomes high to render the ECD drive circuit 33 operative. Meanwhile, the level of the $\overline{Q}$ output 46 becomes low to render the ELD drive circuit 34 inoperative.

In the event of Vm<Vref, the level of the output 43 of the level determining device 42 becomes low. The level of the Q output 45 of the F/F 44 also becomes low and that of the $\overline{Q}$ output 46 becomes high. As a result, the ECD drive circuit 33 becomes inoperative and the ELD drive circuit 34 operative.

Figure 6:
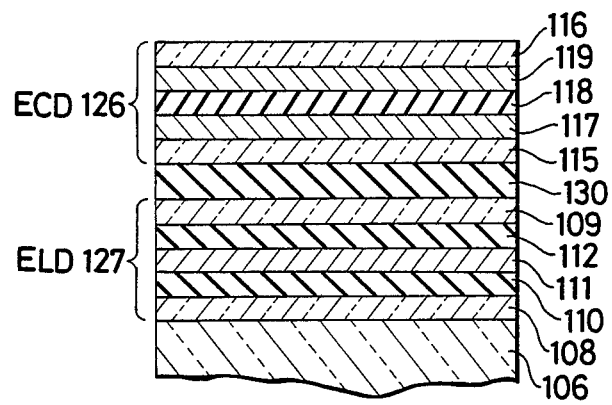
FIGS. 6 and 7 are illustrations of an application example of the invention.
Figure 7:
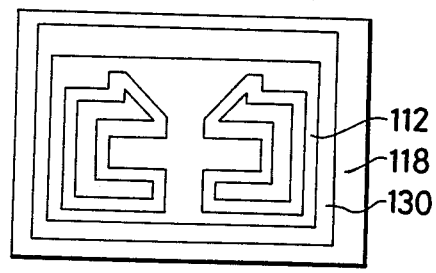

FIGS. 6 and 7 show another embodiment of this invention. In this embodiment, the electro-chromic display element (ECD) and the electro-luminescent display element (ELD), which are shown in FIGS. 1 to 5, are in this case arranged to be electrically separated from each other. The display device consists of a non-luminescent type display element (ECD) 126 and a self-luminescent type display element (ELD) 127. In case that the object to be photographed is bright, the ECD 126 is driven according to a data of distance measurement. The ECD 126 includes transparent electrodes 115 and 116 which are disposed on an insulation layer 130. A first color forming layer 117, which is made of tungstic oxide ($WO_2$ or $WO_3$) or the like, is for example, disposed on a cathode side. An insulation layer 118 is made of a dielectric matter such as zirconium dioxide ($ZrO_2$) or the like. A second color forming layer 119, which is made of, for example, iridium oxide (IrOx) or the like, is disposed on an anode side. These layers 117, 118 and 119 are laminated and arranged one on top of another in between the two transparent electrodes 115 and 116. In the ECD 126, the transparent electrode 115 is thus connected to the first color forming layer 117 and is disposed on the negative side when a voltage is applied to the ECD 126. The other transparent element 116 is connected to the second color forming layer 119 and is disposed on the positive side with the voltage applied. When the voltage is applied to the ECD 126 in this manner, the insulation layer 118 causes the proton $H^+$ to be supplied to the first color forming layer 117 and a hydroxyl group $OH^-$ to be supplied to the second color forming layer 119. An oxidation reduction reaction takes place to bring a color. In case that the ECD 126 is to be rendered inoperative according to the distance masurement data, a voltage which is opposite to the above-stated voltage is applied. Then, the color disappears. In the event of a dark object to be photographed, the ELD 127 is driven. The ELD 127 includes transparent electrodes 108 and 109 which are formed on a glass base plate 106. The following layers are interposed in a laminated state in between the transparent electrodes 108 and 109: A first insulation layer 110 which is typically made of yttrium oxide ($Y_2O_3$); a luminescent layer 111 which is typically made of ZnS doped with Mn; and a second insulation layer 112 which is typically made of $Y_2O_3$. When an AC voltage of 200 V or thereabout is applied between the transparent electrodes 108 and 109 in a peak-to-peak manner, the part interposed in between the two electrodes 108 and 109 begins to emit light. The ELD 127 is formed beneath the ECD 126 and is covered with the insulation layer 130 which is made of silicon oxide ($SiO_2$) or the like. This arrangement prevents dielectric breakdown due to sticking of some water content to the ELD.

FIG. 7 shows arrangement of this embodiment to electrically separate the ELD 127 and ECD 126 from each other and to have them driven independently of each other. For this purpose, the transparent electrodes 108 and 109 of the ELD 127 and those 115 and 116 of the ECD 126 are electrically separated by controlling the sizes of their insulation layers. More specifically, in the ELD 127, the size of the second insulation layer 112 is arranged to be larger than the first insulation layer 110 and the luminescent layer 111. The insulation layer 130 is arranged to be larger than the second insulation layer 112 of the ELD 127. The size of the insulation layer 118 of the ECD 126 is arranged to be larger than the insulation layer 130. This arrangement completely separates these transparent electrodes 108, 109, 115 and 116 from each other and permits them to be independently connected to the external drive circuits shown in FIGS. 4 and 5.

Further, with regard to the ELD 127, after the layers of the ELD 127 are laminated, the crystalline structure of each layer must be improved by annealing. As for the ECD 126, it must be prepared at temperature not exceeding 100° C. If not, evaporation of a water content would hinder the color forming and extinguishing processes. Therefore, in unifying them into one body, the ELD 127 must be first formed on the glass base plate or substrate 106 and, after that, the insulation layer 130 and the ECD 126 are formed. Further, if it is necessary to isolate the display device of this invention from the outside, a passivation film may be applied to the surface of the transparent electrode 116 or silicone oil or the like may be used for sealing.

In accordance with this invention, the display means (ECD) of the non-luminescent type and the display means (ELD) of the self-luminescent type are laminated into one body. The display device thus arranged as described in the foregoing is capable of always satisfactorily making a display irrespectively of the luminance of the object to be photographed.

The display device according to this invention is capable of appropriately providing the photographer with photographic data by selectively operating the display element ECD or ELD according to the luminance of the object to be photographed.

It is an advantage of this invention that the display elements ECD and ELD are formed into the shape of information to be observed so that the information can be used as photographic data in the shape as observed by the photographer.

With the color forming layer of the ECD formed to have a wider width than the luminescent layer of the ELD according to this invention, this arrangement gives the following advantage in cases where both the ECD and ELD are to be simultaneously lighted up in making a display. In other words, in case that the brightness of the view finder field becomes excessive due to the brightness of the object and that the display made by the ELD becomes hardly discernible due to the bright state of the background, the display made by the ECD permits visual observation, so that the observable range of the display part can be broadened by virtue of the arrangement of this invention.

What is claimed is:

1. A display device for photographing information of a camera, comprising:
   first display means which has an optical density thereof varied as a voltage is applied thereto for forming photographing information;

second display means which emits light as a voltage is applied thereto thus forming information with a same content as that of the photographing information formed by said first display means; and supply means for selectively supplying the voltage to said first display means and said second display means depending on brightness of an object to be photographed.

2. A device according to claim 1, wherein said photographing information is an information indicating a focusing direction of a photo-taking lens.

3. A device according to claim 1, wherein said supply means supplied the voltage to said first display means when the object brightness is high, and supplies the voltage to said second display means when the object brightness is low.

4. A display device for a camera, comprising:

an electro-chromic display element including a color forming layer formed into the shape of data relative to photographing information;

an electro-luminescent display element including a luminescent layer formed into the shape of the data relative to photographing information;

a display part having said electro-chromic display element and said electro-luminescent display element arranged there in a laminated state, said display part being arranged to make a visually observable display by virtue of said color forming layer and/or said luminescent layer;

first operating means for operating said electro-chromic display element;

second operating means for operating said electro-luminescent display element; and selecting means for selecting the operation of said first operating means or that of said second operating means.

5. A device according to claim 4, wherein the width of said color forming layer is wider than that of said luminescent layer.

6. A device according to claim 4, wherein said color forming layer and said luminescent layer are formed in a shape indicating a focusing direction of a phototaking lens.

7. A device according to claim 4, wherein said selecting means operates said first operating means when an object to be photographed is bright and operates said second operating means when the object is dark.

8. A device according to claim 4, wherein a shape of said electro-chromic display element is same as that of said electro-luminescent display element.

* * * * *